US 6,682,847 B2

(12) United States Patent
Inoue et al.

(10) Patent No.: US 6,682,847 B2
(45) Date of Patent: Jan. 27, 2004

(54) ALUMINUM BATTERY CASING WITH CORROSION PREVENTING FILM

(75) Inventors: Takefumi Inoue, Kyoto (JP); Shinya Kitano, Kyoto (JP); Hiroaki Yoshida, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/408,558

(22) Filed: Sep. 30, 1999

(65) Prior Publication Data

US 2003/0129487 A1 Jul. 10, 2003

(30) Foreign Application Priority Data

Sep. 30, 1998  (JP) .......................................... P10-278051

(51) Int. Cl.$^7$ ................................................. H01M 2/08
(52) U.S. Cl. ........................................ 429/167; 429/185
(58) Field of Search ................................ 429/176, 127, 429/177, 185, 163, 167, 164

(56) References Cited

U.S. PATENT DOCUMENTS

| 4,511,416 A | * | 4/1985 | Karpiloff | 156/69 |
| 6,326,652 B1 | * | 7/1994 | Lake | 429/127 |
| 5,834,133 A | * | 11/1998 | Narukawa | 429/171 |

FOREIGN PATENT DOCUMENTS

| BE | 721262 A | * | 9/1968 | ............ H01M/2/02 |
| GB | 1393305 A | * | 5/1975 | ............ H01M/2/02 |
| JP | 51013549 | * | 1/1986 | ............ H01M/2/02 |
| JP | 4155746 | * | 5/1992 | ............ H01M/2/02 |
| JP | 06-236750 | | 8/1994 | |
| JP | 410261386 A | * | 9/1998 | ............ H01M/2/02 |

* cited by examiner

Primary Examiner—Mark Ruthkosky
(74) Attorney, Agent, or Firm—Sughrue Mion, PLLC

(57) ABSTRACT

In a battery having a aluminum or aluminum alloy casing welded to and aluminum or aluminum alloy cover, a film of a synthetic resin and a corrosion preventing agent is formed on the outer surface of the battery raising and an electrolyte comprising hydrofluoric acid is placed in the casing. The film is capable of absorbing hydrofluoric acid. In an alternative embodiment, the exterior film may be a ceramic material capable of absorbing hydrofluoric acid.

18 Claims, 3 Drawing Sheets

ALUMINUM BATTERY CASING WITH CORROSION PREVENTING FILM

BACKGROUND OF THE INVENTION

1. Field of the Invention

The present invention relates to a battery using a battery casing made of aluminum or an aluminum alloy.

2. Description of the Related Art

For example, as shown in FIG. 3, a small-size nonaqueous electrolyte secondary battery is configured so that elements such as electric power generating elements, etc., not shown, are enclosed with a box-shaped battery casing 1 which includes a casing body portion 1a and a cover portion 1b. In the past, a nickel-plated steel plate or a stainless steel material was used in the casing body portion 1a and the cover portion 1b in the battery casing 1 of the small-size nonaqueous electrolyte secondary battery. Recently, an aluminum alloy material is often used for the purpose of reducing the weight of the battery.

For example, as shown in FIG. 4, a large-size nonaqueous electrolyte secondary battery is configured so that elements such as electric power generating elements, etc., not shown, are enclosed with an elliptic cylinder-like battery casing 1 which includes a casing body portion 1a and a cover portion 1b. In the past, a stainless steel material was also used in the casing body portion 1a and the cover portion 1b in the battery casing 1 of the large-size nonaqueous electrolyte secondary battery. Recently, an aluminum alloy material, such as a material according to JIS-A3003, is often used for the purpose of reducing the weight of the battery.

The conventional nonaqueous electrolyte secondary battery, especially a large-size one, was often used as a combination battery. Accordingly, the battery casing 1 was covered with a heat-shrinkable tube of vinyl chloride resin, a polyolefin type synthetic resin, or the like, and the tube was heated so as to shrink to thereby electrically insulate the circumference of the battery casing 1.

If the battery was wet with seawater or water when the battery casing 1 was covered with such a heat-shrinkable tube, the seawater or water penetrated into a gap between the heat-shrinkable tube and the battery casing 1 through an end portion of the heat-shrinkable tube so that the seawater or water could not go out of the gap for a long time. Further, drops of dew were often collected in the gap between the heat-shrinkable tube and the battery casing 1. Accordingly, when an aluminum alloy material was used in the battery casing 1, there was a problem of a risk of leakage of electrolytic solution because seawater or water corroded the aluminum alloy material to make a hole in the battery casing 1 if the seawater or water penetrated between the battery casing 1 if the seawater or water penetrated between the battery casing 1 and the heat-shrinkable tube. Particularly in the case of a nonaqueous electrolyte secondary battery used for marine purposes, aerospace purposes, or the like, the aforementioned problem became manifest.

SUMMARY OF THE INVENTION

It is an object of the present invention to provide a battery having a battery casing coated with synthetic resin, ceramics or alumite to thereby prevent aluminum of the battery casing from corroding.

A battery according to the present invention comprises a battery case made of aluminum or an aluminum alloy, an inside of the battery being closed with said battery casing; and a film formed on an outer surface of the battery casing, the film being one of a film of synthetic resin, a film of ceramic coating and a film formed by an aluminum oxide film-forming treatment.

DETAILED DESCRIPTION OF THE INVENTION

Figure 1:
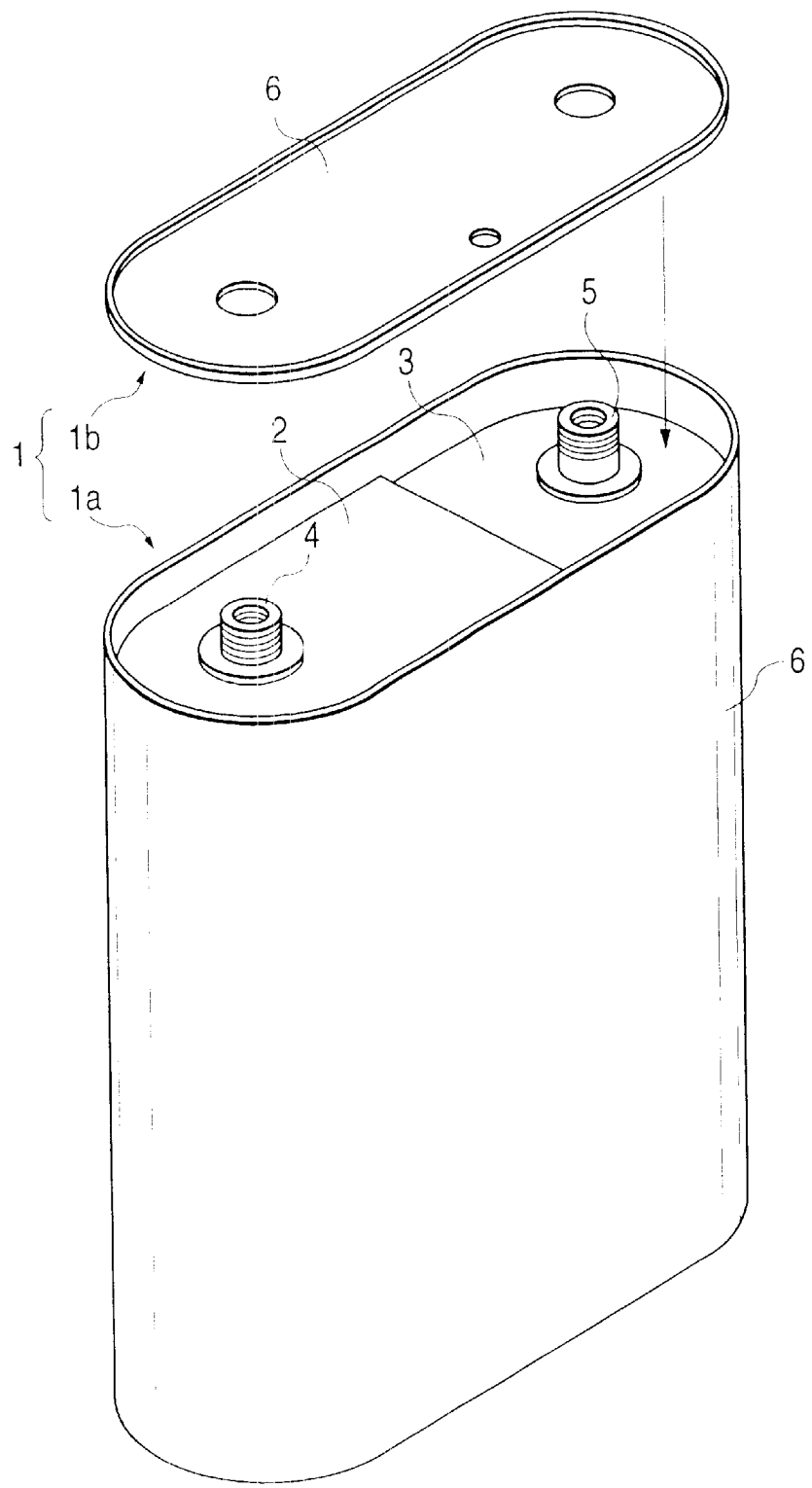
FIG. 1 is a perspective view showing a first to third embodiments of the present invention and showing the configuration of a battery casing of a nonaqueous electrolyte secondary battery.

The present invention will be described in detail as follows.

The present invention provides a battery having an inside closed with a battery casing made of aluminum or an aluminum alloy, wherein a film of synthetic resin is formed on an outer surface of the battery casing.

Accordingly, synthetic resin is applied on the outer surface of the battery casing to thereby cover the outer surface of the battery casing with a film. Therefore, not only the battery casing is insulated electrically but also there is no risk of corrosion of the aluminum material or aluminum alloy material of the battery casing because seawater or water is prevented from touching the aluminum material or aluminum alloy material of the battery casing directly.

The present invention further provides a battery having an inside closed with a battery casing made of aluminum or an aluminum alloy, wherein a film is formed on an outer surface of the battery casing by ceramic coating.

Accordingly, ceramic coating is applied to the outer surface of the battery casing to cover the outer surface of the battery casing with a film. Therefore, not only the battery casing is insulated electrically but also there is no risk of corrosion of the aluminum material or aluminum alloy material of the battery casing because seawater or water is prevented from directly touching the aluminum material or aluminum alloy material of the battery casing. Particularly, the ceramic material serves as a peel-resistant and strong coating material because not only the ceramic material has both electrical insulating characteristic and corrosion resistance little deteriorated but also the ceramic film of alumina adheres firmly to a surface of the aluminum material or aluminum alloy material.

The present invention provides a battery having an inside closed with a battery casing made of aluminum or an aluminum alloy, wherein a film is formed on an outer surface of the battery casing by an aluminum oxide film-forming treatment.

Accordingly, the outer surface of the battery casing is covered with a film by an aluminum oxide film-forming treatment. Therefore, not only the battery casing is insulated electrically but also there is no risk of corrosion of the aluminum material or aluminum alloy material of the battery casing because seawater or water is prevented from directly touching the aluminum material or aluminum alloy material of the battery casing. Particularly, alumite serves as a peel-resistant and strong coating material because not only alumite has both electrical insulating characteristic and corrosion resistance little deteriorated but also the alumite film is formed on a surface of the aluminum material or aluminum alloy material by an oxide film-forming treatment.

In the above battery, a film of synthetic resin is preferably further formed on a surface of the film formed on the outer surface of the battery casing by ceramic coating or oxide film-forming treatment.

Accordingly, the ceramic or alumite film covering the battery casing is further covered with synthetic resin. Accordingly, not only the risk of corrosion of the aluminum material or aluminum alloy material of the battery casing can be eliminated securely but also the electrical insulating characteristic of the battery casing can be enhanced. Further, the film of synthetic resin can protect the fragile ceramic or alumite film. In addition, the film of synthetic resin has adhesive characteristic enhanced by the porous ceramic or alumite film.

In the above battery, the film of synthetic resin is preferably mixed with a rust-preventing agent for preventing corrosion of aluminum.

Thus, a rust-preventing agent is mixed with the film of synthetic resin which covers the battery casing. Accordingly, the risk of corrosion of the aluminum material or aluminum alloy material of the battery casing can be eliminated securely.

Embodiments of the present invention will be described below with reference to the drawings.

Figure 2:
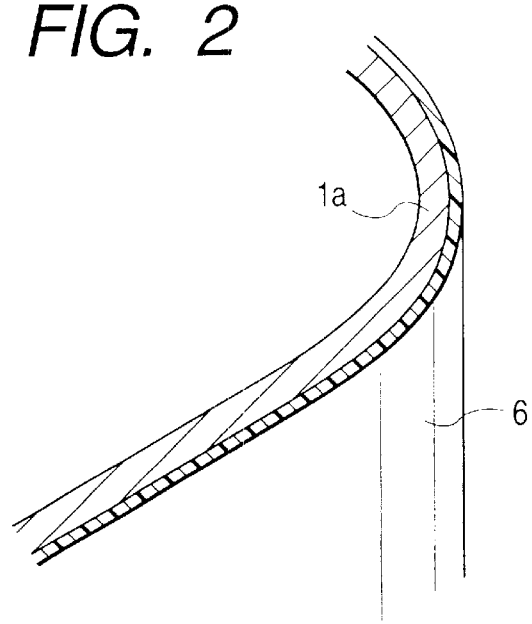
FIG. 2 is a partly enlarged cross-sectional view showing the first to third embodiments of the present invention and showing a film formed on the outer surface of the casing body portion.
Figure 3:
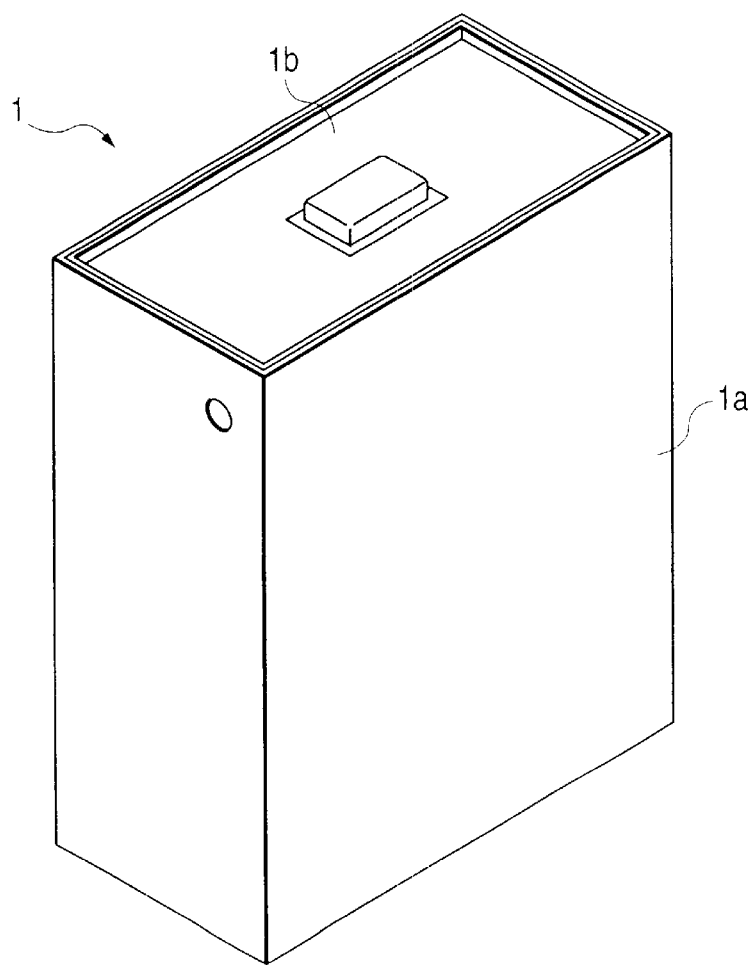
FIG. 3 is a perspective view showing the configuration of a small-size nonaqueous electrolyte secondary battery.
Figure 4:
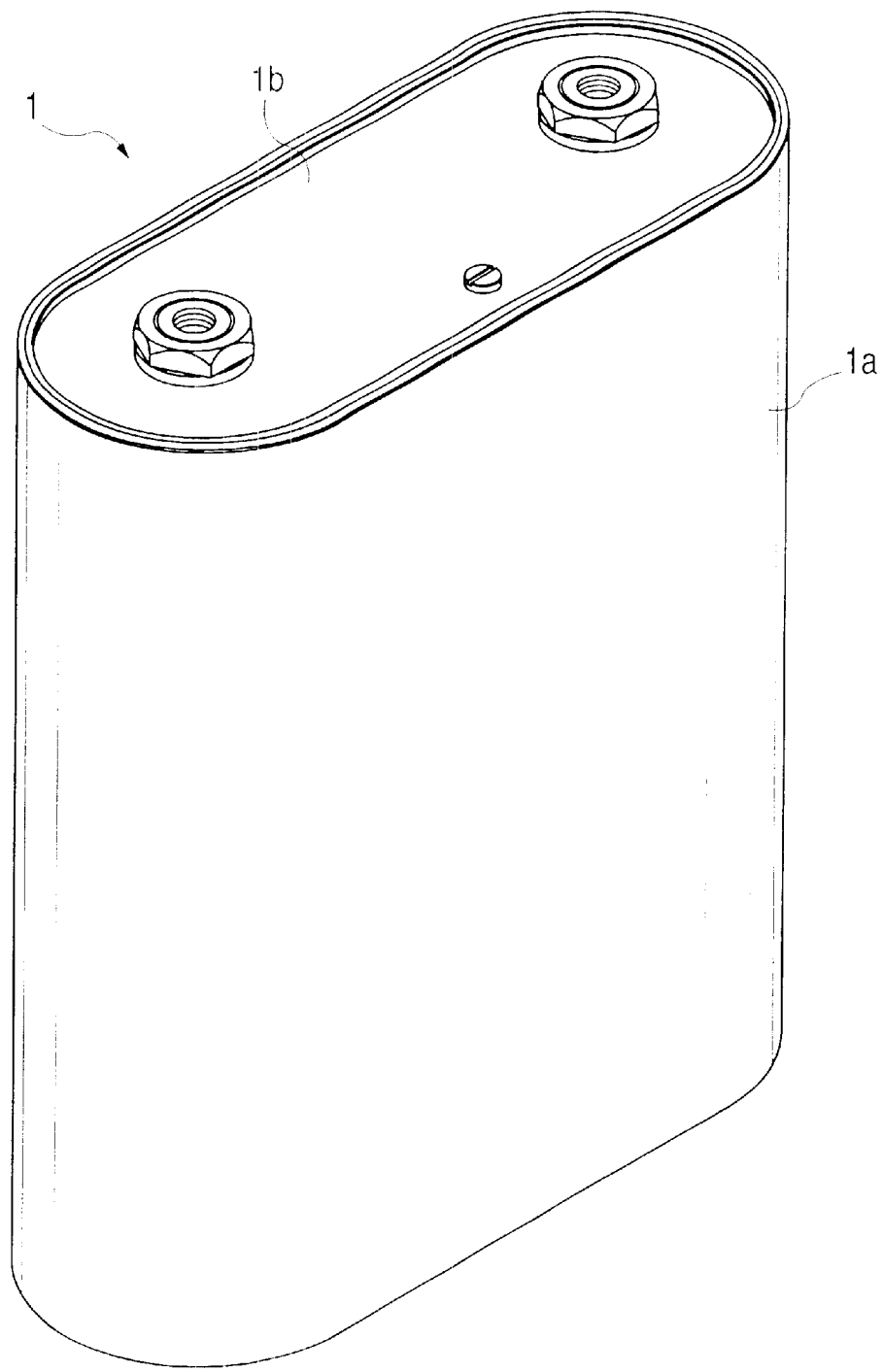
FIG. 4 is a perspective view showing the configuration of a large-size nonaqueous electrolyte secondary battery.

FIGS. 1 and 2 shows a first embodiment of the present invention. FIG. 1 is a perspective view showing the configuration of a battery casing of a nonaqueous electrolyte secondary battery according to the present invention. FIG. 2 is a partly enlarged cross-sectional view showing a film formed on an outer surface of a casing body portion. Incidentally, in FIGS. 1 and 2, the constituent members having the same functions as those in FIGS. 3 and 4 are referenced correspondingly.

This embodiment will be described in connection with a large-size nonaqueous electrolyte secondary battery similar to the battery shown in FIG. 4. As shown in FIG. 1, the battery casing 1 of the nonaqueous electrolyte secondary battery includes an elliptic cylinder-like casing body portion 1a made of an aluminum alloy, and an ellipsoid plate-like cover portion 1b made of an aluminum alloy. Electric power elements, which are not shown but connected to positive and negative electrode terminals 4 and 5 through collector plates 2 and 3, are contained in the inside of the casing body portion 1a. On the other hand, the cover portion 1b is fitted into an upper-end opening portion of the casing body portion 1a and fusion-bonded to the casing body portion 1a at a joint portion by laser welding to thereby close the inside of the casing body portion 1a. Respective upper end portions of the positive and negative electrode terminals 4 and 5 are protruded out from opening holes of the cover portion 1b while sealed so as to be insulated electrically.

Synthetic resin is applied on respective outer surfaces of the casing body portion 1a and the cover portion 1b in advance, so that a film 6 of the synthetic resin is formed on respective outer surfaces of the casing body portion 1a and the cover portion 1b. In the present invention, the thickness of the film of the synthetic resin is preferably in the range of 10 µm to 500 µm, more preferably, in the range of 50 µm to 300 µm. Examples of the synthetic resin used includes: an acrylic type resin, an urethane type resin, a silicone type resin, or the like, which is dissolved in an organic solvent, applied and dried at room temperature or by heating; a two-part epoxy resin which is polymerized at room temperature or by heating; and the like. Further, because the casing body portion 1a and the cover portion 1b can be heated to a high temperature in a range of from 200 to 300° C. before assembling, a heat-curable synthetic resin such as polyimide, phenol resin, polyamide-imide, or the like, may be also used as the synthetic resin. Incidentally, the synthetic resin is an obstacle to fusion-bonding of the aluminum alloy material in laser welding. Therefore, the synthetic resin needs to be prevented from being applied on the upper-end opening edge of the casing body portion 1a and the circumferential edge portion of the outer surface of the cover portion 1b or needs to be removed from the upper-end opening edge of the casing body portion 1a and the circumferential edge portion of the outer surface of the cover portion 1b before laser welding. It is preferable that the synthetic resin is applied on this welding region after laser welding.

In the nonaqueous electrolyte secondary battery configured as described above, the outer surface of the battery casing 1 is covered with the film 6 of synthetic resin. Accordingly, when a plurality of this type nonaqueous electrolyte secondary batteries are used as a combination battery, respective battery casings 1 can be insulated electrically from one another. Furthermore, when the nonaqueous electrolyte secondary battery is wet with seawater or water, the film 6 shields the aluminum alloy material of the battery casing 1 from seawater or water. Accordingly, the aluminum alloy material of the battery casing 1 is prevented from touching the seawater or water directly. There is no risk of corrosion of the aluminum alloy material.

Alternatively, the synthetic resin may be applied on the outer surface of the battery casing 1 after the nonaqueous electrolyte secondary battery is assembled by laser-welding the cover portion 1b to the casing body portion 1a. In this application of the synthetic resin, the terminals 4 and 5 are masked so that the synthetic resin is not deposited on the terminals 4 and 5. When the synthetic resin is applied after the secondary battery is assembled, coating can be performed securely because the synthetic resin can be applied also on the welding region subjected to laser welding. However, heat-curable synthetic resin cannot be used as the synthetic resin because the nonaqueous electrolyte secondary battery cannot be exposed to a high temperature after the nonaqueous electrolyte secondary battery is assembled.

Further, the synthetic resin may be mixed with a rust-preventing agent for preventing corrosion of aluminum. Examples of the rust-preventing agent include: alkali earth metal oxide, such as alumina, zirconia, magnesium oxide, etc., capable of adsorbing hydrofluoric acid (HF); hydroxide of magnesium or aluminum; and carbonate of magnesium or aluminum. The electrolytic solution in the nonaqueous electrolyte secondary battery may contain hydrofluoric acid. The content of the rust-preventing agent in the synthetic resin is in the range of 0.1 vol % to 50 vol %. Accordingly, when the synthetic resin is mixed with a rust-preventing agent capable of adsorbing hydrofluoric acid, the aluminum alloy material of the battery casing 1 can be prevented from corroding even if hydrofluoric acid touches the outer surface of the battery casing 1 of one nonaqueous electrolyte secondary battery in a combination battery because the electrolytic solution leaks from another nonaqueous electrolyte secondary battery in the combination battery.

A second embodiment of the present invention will be described below. Incidentally, in this second embodiment, the constituent members having the same functions as those in the first embodiment shown in FIGS. 1 and 2 are referenced correspondingly.

Similarly to the first embodiment, the battery casing 1 of the nonaqueous electrolyte secondary battery in this embodiment includes an elliptic cylinder vessel-like casing body portion 1a made of an aluminum alloy, and an ellipsoid plate-like cover portion 1b made of an aluminum alloy. In this embodiment, however, ceramic coating is applied in advance so that a ceramic film 6 is formed on respective outer surfaces of the casing body portion 1a and the cover portion 1b. In the present invention, the thickness of the film of the ceramic coating is preferably in the range of 10 $\mu$m to 500 $\mu$m, more preferably, in the range of 50 $\mu$m to 300 $\mu$m. Ceramic coating is a technique for forming a ceramic film 6 so that a surface of a base material is covered with the ceramic film 6. In this embodiment, coating is performed by spraying a ceramic material molten by plasma onto outer surfaces of the casing body portion 1a and the cover portion 1b. Alumina (aluminum oxide) is used for this ceramic coating. Generally, alumina, zirconia, or the like, easy to melt is used for ceramic coating. The ceramic film 6 is, however, an obstacle to fusion-bonding of the aluminum alloy material when the cover portion 1b is fitted into the upper-end opening portion of the casing body portion 1a and laser-welded to the casing body portion 1a. Accordingly, ceramic coating needs to be applied in advance on the casing body portion 1a and the cover portion 1b except the upper-end opening edge of the casing body portion 1a and the circumferential edge portion of the outer surface of the cover portion 1b or the film 6 needs to be removed from the upper-end opening edge of the casing body portion 1a and the circumferential edge portion of the outer surface of the cover portion 1b before laser welding. It is preferable that ceramic coating is applied also on this welding portion after laser welding.

In the nonaqueous electrolyte secondary battery configured as described above, the outer surface of the battery casing 1 is covered with the ceramic film 6. Accordingly, when a plurality of this type nonaqueous electrolyte secondary batteries are used as a combination battery, respective battery casings 1 can be insulated electrically from one another. Furthermore, when the nonaqueous electrolyte secondary battery is wet with seawater or water, the film 6 shields the aluminum alloy material of the battery casing 1 from seawater or water. Accordingly, the aluminum alloy material of the battery casing 1 is prevented from touching the seawater or water directly. There is no risk of corrosion of the aluminum alloy material. The ceramic material is an inorganic material and little deteriorates with the passage of time. Accordingly, both electrical insulating characteristic and corrosion resistance of the ceramic material little deteriorate. Further, the ceramic film 6 of alumina serves as a peel-resistant and strong coating material because the ceramic film 6 of alumina enters the surface of the aluminum alloy material of the battery casing 1 so as to adhere firmly to the aluminum alloy material of the battery casing 1. Further, because alumina adsorbs hydrofluoric acid, the aluminum alloy material of the battery casing 1 of one nonaqueous electrolyte secondary battery in a combination battery can be prevented from corroding even in the case where hydrofluoric acid touches the outer surface of the battery casing 1 because the electrolytic solution leaks from another nonaqueous electrolyte secondary battery in the combination battery.

Alternatively, ceramic coating may be applied to the outer surface of the battery casing 1 after the nonaqueous electrolyte secondary battery is assembled by laser-welding the cover portion 1b to the casing body portion 1a. In this ceramic coating, the terminals 4 and 5 are masked so that the ceramic material is not deposited on the terminals 4 and 5. When ceramic coating is applied after the nonaqueous electrolyte secondary battery is assembled, coating can be performed securely because coating can be applied at the same time also to the welding region subjected to laser welding.

The first and second embodiments have been described upon the case where the film 6 is formed only on outer surfaces of the casing body portion 1a and the cover portion 1b. If the film 6 is further formed on inner surfaces of the casing body portion 1a and the cover portion 1b, hydrofluoric acid in the electrolytic solution of the nonaqueous electrolyte secondary battery can be adsorbed to thereby prevent the inner surface of the battery casing 1 from corroding with hydrofluoric acid.

A third embodiment of the present invention will be described below. Incidentally, in this embodiment, the constituent members having the same functions as those in the first embodiment shown in FIGS. 1 and 2 are referenced correspondingly.

Similarly to the first embodiment, the battery casing 1 of the nonaqueous electrolyte secondary battery in this embodiment includes an elliptic cylinder vessel-like casing body portion 1a made of an aluminum alloy, and an ellipsoid plate-like cover portion 1b made of an aluminum alloy. In this embodiment, however, an oxide film-forming treatment is applied in advance so that an alumite (aluminum oxide) film 6 is formed on respective surfaces of the casing body portion 1a and the cover portion 1b. For example, the oxide film-forming treatment uses anodic oxidation in which the casing body portion 1a and the cover portion 1b are used as anodes respectively in the electrolytic solution so that surfaces thereof are oxidized. The alumite film 6 is, however, an obstacle to fusion-bonding of the aluminum alloy material when the cover portion 1b is fitted into the upper-end opening portion of the casing body portion 1a and laser-welded to the casing body portion 1a. Accordingly, the upper-end opening edge of the casing body portion 1a and the circumferential edge portion of the outer surface of the cover portion 1b need to be masked in advance so as not to be oxidized or the film 6 needs to be removed from the upper-end opening edge of the casing body portion 1a and the circumferential edge portion of the outer surface of the cover portion 1b before laser welding. It is preferable that the oxide film-forming treatment is applied also on this welding portion after laser welding.

In the nonaqueous electrolyte secondary battery configured as described above, the outer surface of the battery casing 1 is covered with the alumite film 6. Accordingly, when a plurality of this type nonaqueous electrolyte secondary batteries are used as a combination battery, respective battery casings 1 can be insulated electrically from one another. Furthermore, when the nonaqueous electrolyte secondary battery is wet with seawater or water, the film 6 shields the aluminum alloy material of the battery casing 1 from seawater or water. Accordingly, the aluminum alloy material of the battery casing 1 is prevented from touching the seawater or water directly. There is no risk of corrosion of the aluminum alloy material. Further, alumite is an inorganic material and little deteriorates with the passage of time. Accordingly, both electrical insulating characteristic and corrosion resistance of alumite little deteriorate. Further, the alumite film 6 serves as a peel-resistant and strong coating material because the alumite film 6 enters the surface of the aluminum alloy material of the battery casing 1 so as to adhere firmly to the aluminum alloy material of the battery casing 1. Further, because alumite adsorbs hydrofluoric acid, the aluminum alloy material of the battery casing 1 of one nonaqueous electrolyte secondary battery in a combination battery can be prevented from corroding even in the case where hydrofluoric acid touches the outer surface of the battery casing 1 because the electrolytic solution leaks from another nonaqueous electrolyte secondary battery in the combination battery. The thickness of the alumite layer is not limited specially but, preferably, it is selected to be in a range of from 1 $\mu$m to 100 $\mu$m, more preferably in a range of from 5 $\mu$m to 30 $\mu$m. If the thickness is too small, the effect of preventing corrosion is lowered. If the thickness is too large, there is a problem that the production cost increases. A film 6 is further formed on respective inner surfaces of the casing body portion 1a and the cover portion 1b by anodic oxidation. Accordingly, the film 6 can adsorb hydrofluoric acid in the electrolytic solution of the nonaqueous electrolyte secondary battery to thereby prevent the inner surface of the battery casing 1 from corroding with hydrofluoric acid.

Alternatively, the oxide film-forming treatment may be applied to the outer surface of the battery casing 1 after the nonaqueous electrolyte secondary battery is assembled by laser-welding the cover portion 1b to the casing body portion 1a. In this oxide film-forming treatment, the terminals 4 and 5 are masked so as not to be oxidized. When the oxide film-forming treatment is applied after the nonaqueous electrolyte secondary battery is assembled, coating can be performed securely because the film 6 can be formed at the same time also on the welding region subjected to laser welding. In this case, there is, however, no film 6 formed on the inner surfaces of the casing body portion 1a and the cover portion 1b.

A film 6 of synthetic resin may be further formed stratiformly on a surface of the ceramic or alumite film 6 formed on the outer surfaces of the casing body portion 1a and the cover portion 1b in the second or third embodiment. Further, the aforementioned rust-preventing agent may be mixed with the film 6 of synthetic resin. When the films 6 are formed stratiformly in the aforementioned manner, not only the risk of corrosion of the aluminum alloy material can be eliminated securely but also the electrical insulating characteristic of the battery casing 1 can be enhanced. Furthermore, because the ceramic or alumite film 6 is high in hardness but fragile, the flexible film 6 of synthetic resin can protect the ceramic or alumite film 6 when the ceramic or alumite film 6 is covered with the flexible film 6 of synthetic resin. In addition, since the surface of the ceramic or alumite film 6 is porous, the adhesive characteristic of the synthetic resin can be enhanced. The thickness of the synthetic resin is not limited specially but, preferably, it is selected to be in a range of from 10 $\mu$m to 500 $\mu$m, more preferably in a range of from 50 $\mu$m to 300 $\mu$m. If the thickness is too small, the effect of protecting the ceramic or alumite film is lowered. If the thickness is too large, there is a problem that the heat radiating characteristic of the battery is lowered or the production cost increases.

Although the first, second and third embodiments have been described upon the case where the film 6 is formed on the outer surfaces of the casing body portion 1a and the cover portion 1b in the battery casing 1 of a large-size nonaqueous electrolyte secondary battery, the kind of the battery and the configuration of the battery casing 1 are not limited. Although the above description has been made upon the case where the battery casing 1 is made of an aluminum alloy material, the present invention can be applied also to the case where pure aluminum is used as the material for the battery casing 1. Although the first, second and third embodiments have been described upon the case where the film 6 is formed on the whole outer surface of the battery casing 1, the present invention may be applied also to the case where a portion free from the film 6 remains partially in the battery casing 1 if the battery casing 1 per se can form electrodes as represented by the small-size nonaqueous electrolyte secondary battery shown in FIG. 3.

As is obvious from the above description, in the battery according to the present invention, the battery casing is covered with an electrically insulating film. Accordingly, not only the outer surface of the battery is insulated electrically but also the risk of corrosion of the aluminum material or aluminum alloy material of the battery casing is eliminated because seawater or water is prevented from touching the aluminum material or aluminum alloy material of the battery casing directly. Accordingly, the reliability of the battery can be improved.

What is claimed is:

1. A nonaqueous electrolyte secondary battery comprising:
    an electrolyte comprising hydrofluoric acid,
    a battery case made of aluminum or an aluminum alloy, wherein said battery case comprises a casing body made of aluminum or an aluminum alloy and a cover made of aluminum or an aluminum alloy, wherein said casing body and said cover are closed by welding; and
    a film formed on an outer surface of said battery case, said film being a film of synthetic resin,
    wherein said film of synthetic resin contains a corrosion-preventing agent for preventing corrosion of aluminum, and
    wherein said corrosion-preventing agent is capable of adsorbing hydrofluoric acid.

2. The battery according to claim 1, wherein a film of synthetic resin is formed on an inner surface of said battery casing.

3. The battery according to claim 1, wherein said battery casing includes a casing body portion and a cover portion, so that the film covers both said casing body portion and said cover portion.

4. The battery according to claim 1, wherein the film has a thickness in the range of 10 $\mu$m to 500 $\mu$m.

5. A nonaqueous electrolyte secondary battery comprising:
    an electrolyte comprising hydrofluoric acid,
    a battery case made of aluminum or an aluminum alloy, wherein said battery case comprises a casing body made of aluminum or an aluminum alloy and a cover made of aluminum or an aluminum alloy, wherein said casing body and said cover are closed by welding; and
    a film formed on an outer surface of said battery case, said film being a film of ceramic coating,
    wherein said film of ceramic coating is capable of adsorbing hydrofluoric acid.

6. The battery according to claim 5, wherein a film of synthetic resin is further formed on a surface of said film of ceramic coating, wherein said film of synthetic resin contains a corrosion-preventing agent for preventing corrosion of aluminum, and wherein said corrosion-preventing agent is capable of adsorbing hydrofluoric acid.

7. The battery according to claim 5, wherein a film of ceramic coating is formed on an inner surface of said battery casing.

8. The battery according to claim 5, wherein said battery casing includes a casing body portion and a cover portion, so that the film covers both said casing body portion and said cover portion.

9. The battery according to claim 5, wherein the film has a thickness in the range of 10 $\mu$m to 500 $\mu$m.

10. The battery according to claim 5, wherein said film of ceramic coating includes at least aluminum oxide which is capable of adsorbing hydrofluoric acid.

11. The battery according to claim 5, wherein a plurality of batteries are provided in a combination battery, and said corrosion-preventing agent of one of said plurality of batteries adsorbs hydrofluoric acid that leaks onto a surface thereof from another of said plurality of batteries.

12. A nonaqueous electrolyte secondary battery comprising:
an electrolyte comprising hydrofluoric acid,
a battery case made of aluminum or an aluminum alloy, wherein said battery case comprises a casing body made of aluminum or an aluminum alloy and a cover made of aluminum or an aluminum alloy, wherein said casing body and said cover are closed by welding; and
a film formed on an outer surface of said battery case, said film being formed by an aluminum oxide film-forming treatment,
wherein said film is capable of adsorbing hydrofluoric acid.

13. The battery according to claim 12, wherein a film of synthetic resin is further formed on a surface of said film of the oxide film-forming treatment, wherein said film of synthetic resin contains a corrosion-preventing agent for preventing corrosion of aluminum, and wherein said corrosion-preventing agent is capable of adsorbing hydrofluoric acid.

14. The battery according to claim 12, wherein a film of aluminum oxide is formed on an inner surface of said battery casing.

15. The battery according to claim 12, wherein said battery casing includes a casing body portion and a cover portion, so that the film covers both said casing body portion and said cover portion.

16. The battery according to claim 12, wherein the film has a thickness in the range of 1 $\mu$l to 100 $\mu$m.

17. The battery according to claim 12, wherein a plurality of batteries are provided in a combination battery, and said corrosion-preventing agent of one of said plurality of batteries adsorbs hydrofluoric acid that leaks onto a surface thereof from another of said plurality of batteries.

18. A battery comprising:
a battery case made of aluminum or an aluminum alloy, wherein said battery case comprises a casing body made of aluminum or an aluminum alloy and a cover made of aluminum or an aluminum alloy, wherein said casing body and said cover are closed by welding; and
a film formed on an outer surface of said battery case, said film being a film of synthetic resin,
wherein said film of synthetic resin contains a corrosion-preventing agent for preventing corrosion of aluminum,
wherein said corrosion-preventing agent is selected from the group consisting of (1) an alkali earth metal oxide capable of adsorbing hydrofluoric acid, (2) hydroxide of magnesium or aluminum, and (3) carbonate of magnesium or aluminum.

* * * * *